United States Patent
Smitherman (10) Patent No.: US 12,293,380 B1
(45) Date of Patent: May 6, 2025

(54) PHYSICAL COUPON REDEMPTION SYSTEM AND RELATED METHODS

(71) Applicant: Inmar Clearing, Inc., Winston-Salem, NC (US)

(72) Inventor: Lisa Smitherman, Lewisville, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 192 days.

(21) Appl. No.: 18/102,551

(22) Filed: Jan. 27, 2023

(51) Int. Cl.
  *G06Q 30/02* (2023.01)
  *G06Q 20/38* (2012.01)
  *G06Q 30/0207* (2023.01)

(52) U.S. Cl.
  CPC ....... *G06Q 30/0207* (2013.01); *G06Q 20/387* (2013.01); *G06Q 30/0225* (2013.01)

(58) Field of Classification Search
  CPC ............. G06Q 30/0207; G06Q 20/387; G06Q 30/0225
  See application file for complete search history.

(56) References Cited

U.S. PATENT DOCUMENTS

| | | | | |
|---|---|---|---|---|
| 8,046,257 | B2 * | 10/2011 | Wane | G06Q 30/0225 705/14.1 |
| 11,087,350 | B1 * | 8/2021 | Moser, III | G06K 7/1491 |
| 2011/0276371 | A1 * | 11/2011 | Norcross | G06Q 30/0207 705/14.1 |
| 2013/0085829 | A1 * | 4/2013 | Kavis | G06Q 30/06 705/14.26 |
| 2014/0344043 | A1 | 11/2014 | Hennessy et al. | |
| 2015/0348169 | A1 | 12/2015 | Harris et al. | |
| 2016/0315893 | A1 * | 10/2016 | Carr | H04L 67/02 |
| 2019/0087656 | A1 | 3/2019 | King et al. | |
| 2020/0302468 | A1 | 9/2020 | Karuppan et al. | |

* cited by examiner

*Primary Examiner* — John Van Bramer
(74) *Attorney, Agent, or Firm* — ALLEN, DYER, DOPPELT, + GILCHRIST, P.A.

(57) ABSTRACT

A physical coupon redemption system may include a mobile device associated with a retailer, and a coupon redemption server. The server may obtain a first physical coupon image from the mobile device for a corresponding first physical coupon, and generate a first validation code based upon the first physical coupon image and the retailer. The server may also communicate the first validation code to the mobile device for the given retailer to add the first validation code to the first physical coupon, and obtain a second physical coupon image from the mobile wireless communications device for a corresponding second physical coupon and having a second validation code therein. The server may also determine whether the first and second validation codes match and determine whether the first and second physical coupon images indicate a match between the corresponding first and second physical coupons, and when so redeem the first physical coupon.

15 Claims, 8 Drawing Sheets

PHYSICAL COUPON REDEMPTION SYSTEM AND RELATED METHODS

TECHNICAL FIELD

The present invention relates to the field of electronics, and, more particularly, to a system for redeeming physical coupons, and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon may redeemed at a point-of-sale (POS) device, for example, in communication with a promotions server. For example, during the checkout process, the shopper's basket may be sent to the promotions server. Any coupons to be redeemed by the shopper are generally presented during the checkout process and processed via the POS device. For example, the POS device may send information regarding the coupon to be redeemed to the promotions server for processing.

One type of coupon is a paper coupon. A paper coupon is typically found in a printed publication or advertisement, for example, a newspaper, and is cut from the printed publication. The paper coupon typically includes information about the offer, including product purchase requirements and the discount. The information may be both in printed words and encoded, for example, in the form of a barcode so that it can be scanned for redemption of its redemption value at the POS. The shopper generally presents the paper coupon at the POS device during the checkout process to redeem.

For a given retailer to be reimbursed for the redemption value of the paper coupon, the given retailer typically mails the redeemed paper coupon to the manufacturer or coupon clearinghouse. Upon manual verification of the paper coupon at the clearinghouse, the given retailer may be reimbursed.

SUMMARY

A physical coupon redemption system may include a mobile wireless communications device associated with a given retailer. The physical coupon redemption system may also include a coupon redemption server configured to obtain a first physical coupon image from the mobile wireless communications device for a corresponding first physical coupon, and generate a first validation code based upon the first physical coupon image and the given retailer. The coupon redemption server may also be configured to communicate the first validation code to the mobile wireless communications device for display thereat for the given retailer to add the first validation code to the first physical coupon. The coupon redemption server may also be configured to obtain a second physical coupon image from the mobile wireless communications device for a corresponding second physical coupon and having a second validation code therein, and determine whether the first and second validation codes match and determine whether the first and second physical coupon images indicate a match between the corresponding first and second physical coupons, and when so redeem the first physical coupon.

The coupon redemption server may be configured to determine whether the first and second validation codes match based upon performing an optical character recognition (OCR) of the second physical coupon image, for example. The coupon redemption server may be configured to determine whether the first and second physical coupon images match based upon performing an optical character recognition (OCR) of the first and second physical coupon images.

The coupon redemption server may be configured to determine whether the first and second physical coupon images match based upon a number of matching image characteristics between the first and second physical coupon images, for example. The coupon redemption server may be configured to store a database of fraudulent physical coupon images, and generate the first validation code based upon determining whether the first physical coupon image does not match a stored fraudulent physical coupon image.

The physical coupon redemption system may also include a point-of-sale (POS) device associated with the given retailer. The first physical coupon may have a redemption value associated therewith. The coupon redemption server may be configured to cooperate with POS device to redeem the first physical coupon by applying the redemption value to a purchase at the POS device, for example.

The coupon redemption server may be configured to process payment to the given retailer based upon redemption of the first physical coupon. The given retailer may have a retailer identifier associated therewith, and the mobile wireless communications device may be configured to communicate the retailer identifier to the coupon redemption server, for example. The coupon redemption server may be configured to process the payment to the given retailer based upon the retailer identifier, for example. The coupon redemption server may be configured to cooperate with the mobile wireless communications device to prompt the given retailer to add the first validation code to the first physical coupon.

A method aspect is directed to a method of redeeming a physical coupon. The method may include using a coupon redemption server to obtain a first physical coupon image from a mobile wireless communications device associated with a given retailer, the first physical coupon image being for a corresponding first physical coupon. The method may also include using the coupon redemption server to generate a first validation code based upon the first physical coupon image and the given retailer, and communicate the first validation code to the mobile wireless communications device for display thereat for the given retailer to add the first validation code to the first physical coupon. The method may further include using the coupon redemption server to obtain a second physical coupon image from the mobile wireless communications device for a corresponding second physical coupon and having a second validation code therein, and determine whether the first and second validation codes match and determine whether the first and second physical coupon images indicate a match between the corresponding first and second physical coupons, and when so redeem the first physical coupon.

A computer readable medium aspect is directed to a non-transitory computer readable medium for redeeming a physical coupon. The non-transitory computer readable medium includes computer executable instructions that when executed by a processor cause the processor to perform operations. The operations may include obtaining a first physical coupon image from a mobile wireless communications device associated with a given retailer, the first physical coupon image being for a corresponding first physical coupon, and generating a first validation code based upon the first physical coupon image and the given retailer. The operations may also include communicating the first validation code to the mobile wireless communications device for display thereat for the given retailer to add the first validation code to the first physical coupon, and obtaining a second physical coupon image from the mobile wireless communications device for a corresponding second physical coupon and having a second validation code therein. The operations may also include determining whether the first and second validation codes match and determining whether the first and second physical coupon images indicate a match between the corresponding first and second physical coupons, and when so redeeming the first physical coupon.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
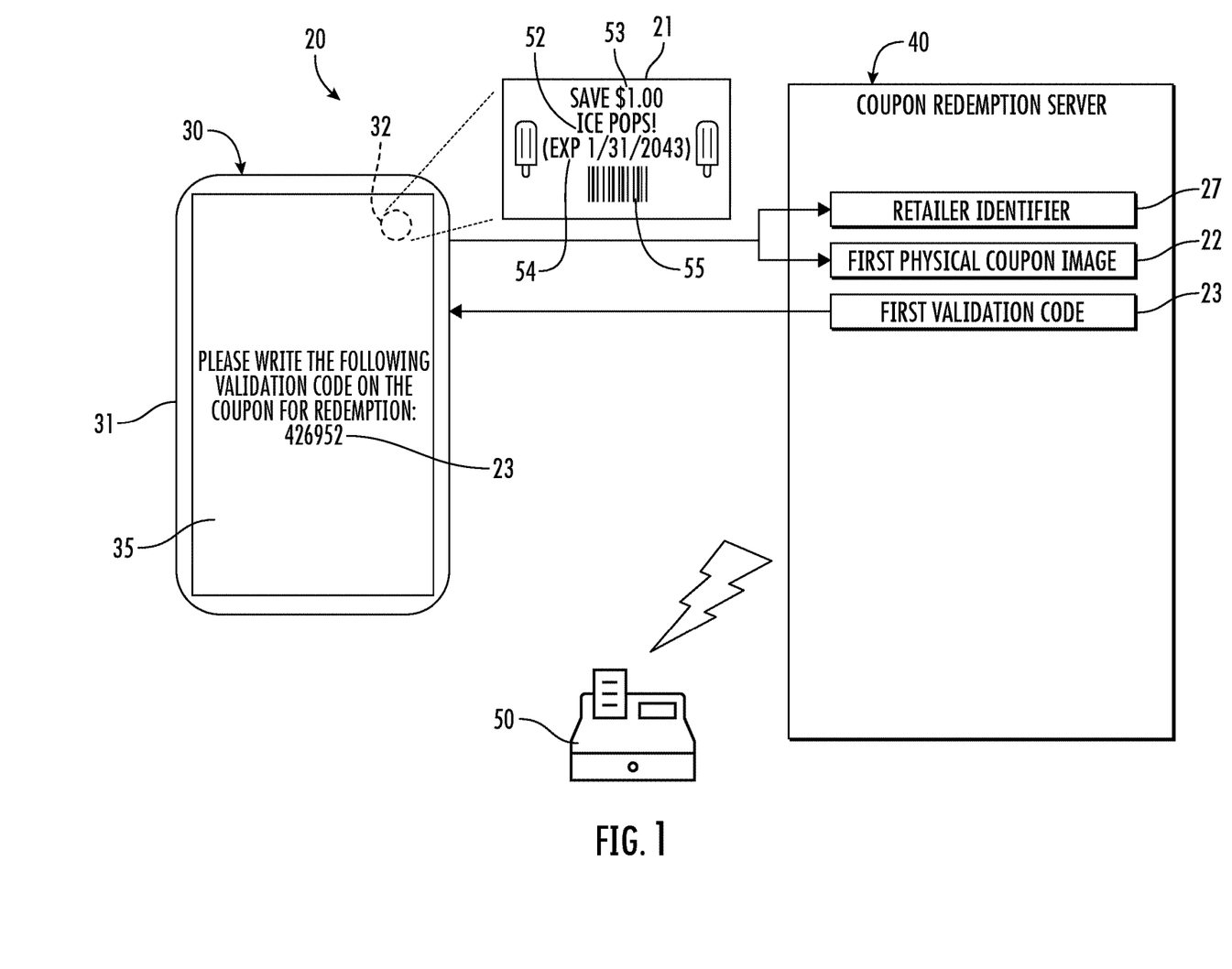
FIG. 1 is a schematic diagram of a physical coupon redemption system in accordance with an embodiment.
Figure 2:
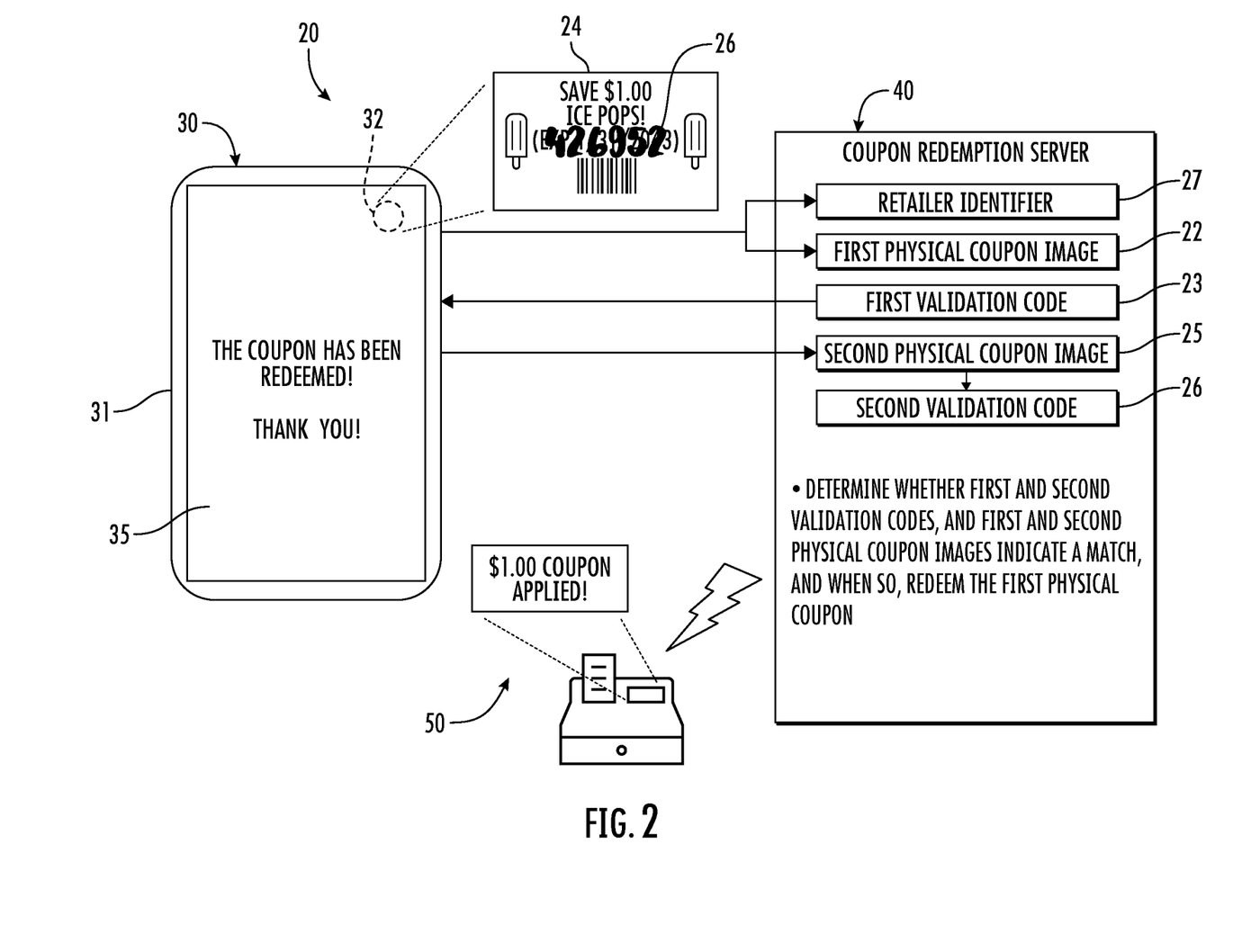
FIG. 2 is another schematic diagram of the physical coupon redemption system of FIG. 1.
Figure 3:
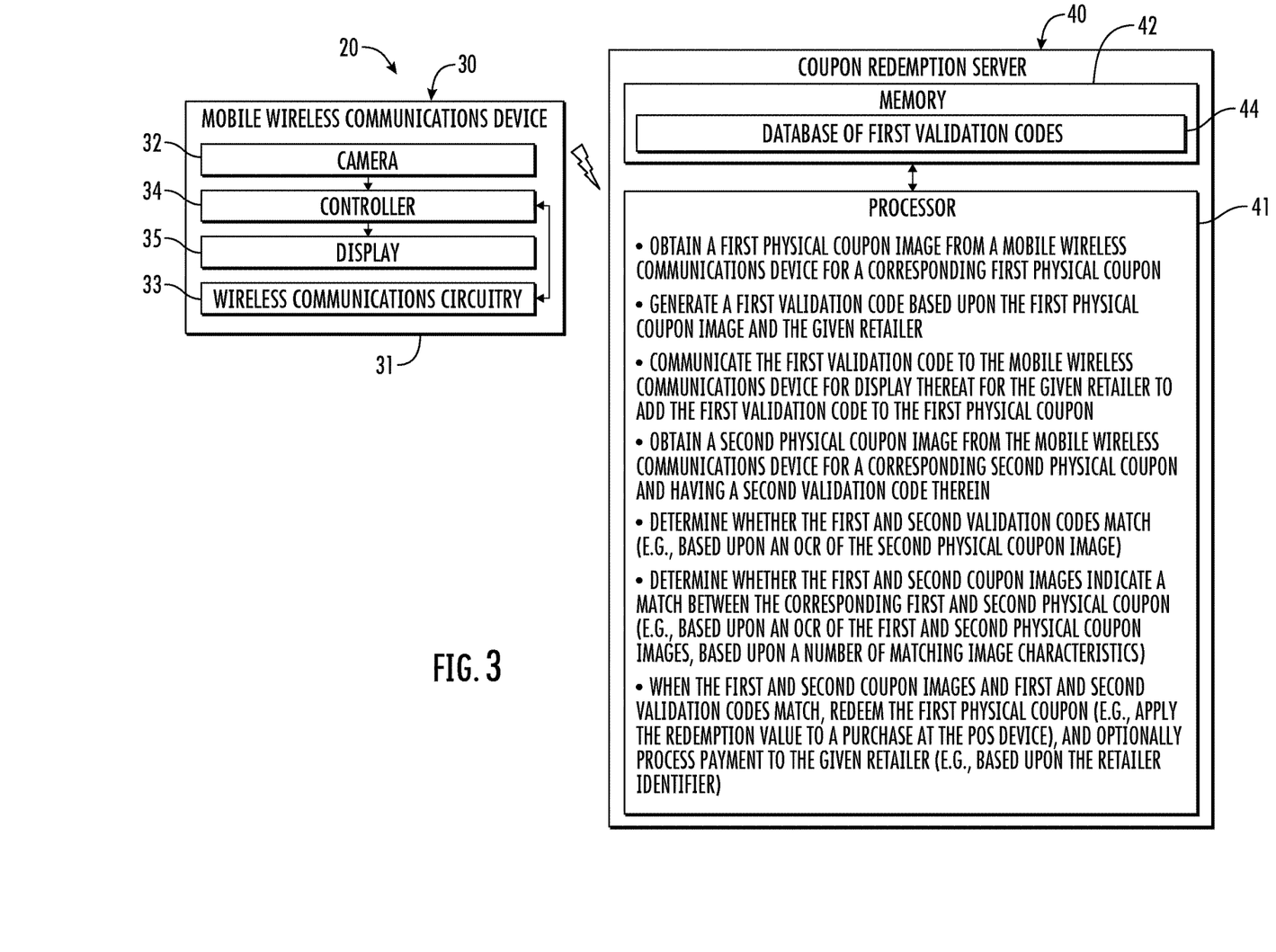
FIG. 3 is a schematic block diagram of the physical coupon redemption system of FIG. 1.

Referring initially to FIGS. 1-3, a physical coupon redemption system 20 includes a mobile wireless communications device 30 associated with a given retailer. The mobile wireless communications device is illustratively in the form of a mobile phone or smartphone. The mobile wireless communications device 30 may be in another form, for example, a tablet computer, personal computer, laptop computer, or wearable device.

The mobile wireless communications device 30 illustratively includes a housing 31 and a camera 32 and a display 35 carried by the housing. Wireless communications circuitry 33 is also carried by the housing 31 and may include long- and short-range wireless communications circuitry, for example, Bluetooth, WiFi, cellular, near-field communications (NFC), etc. A controller 34 is also carried by the housing 31 and coupled to the wireless communications circuitry 33 and cooperates therewith to perform one or more wireless communications functions.

The physical coupon redemption system 20 also includes a coupon redemption server 40. The coupon redemption server 40 includes a processor 41 and a memory 42 cooperating therewith and cooperates to redeem a physical coupon. While operations of the coupon redemption server 40 are described herein, it should be appreciated that the processor 41 and the memory 42 cooperate to perform the operations.

Figure 4A:
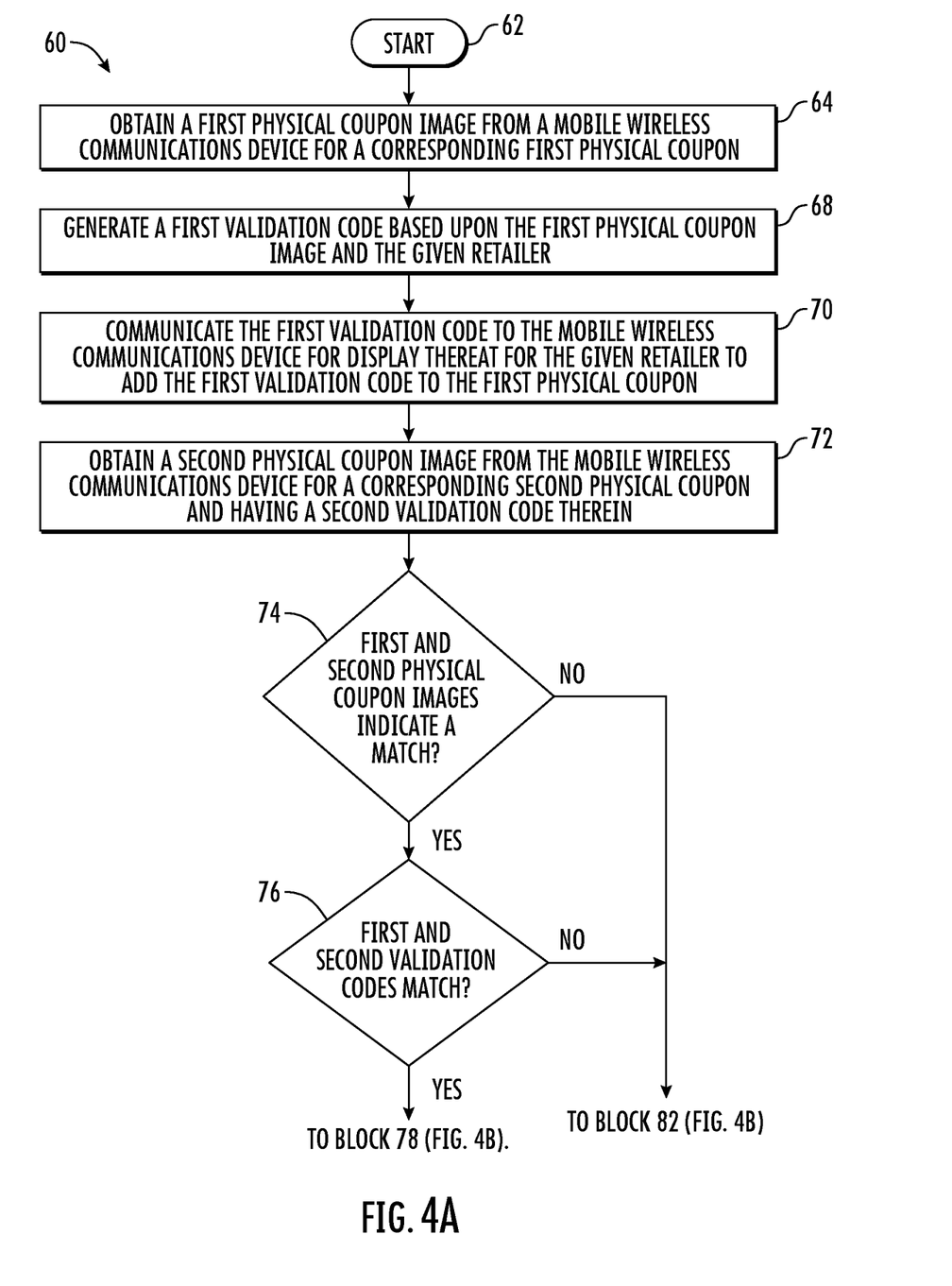
FIGS. 4a and 4b are flow diagrams illustrating operation of the coupon redemption server of the physical coupon redemption system of FIG. 1.
Figure 4B:
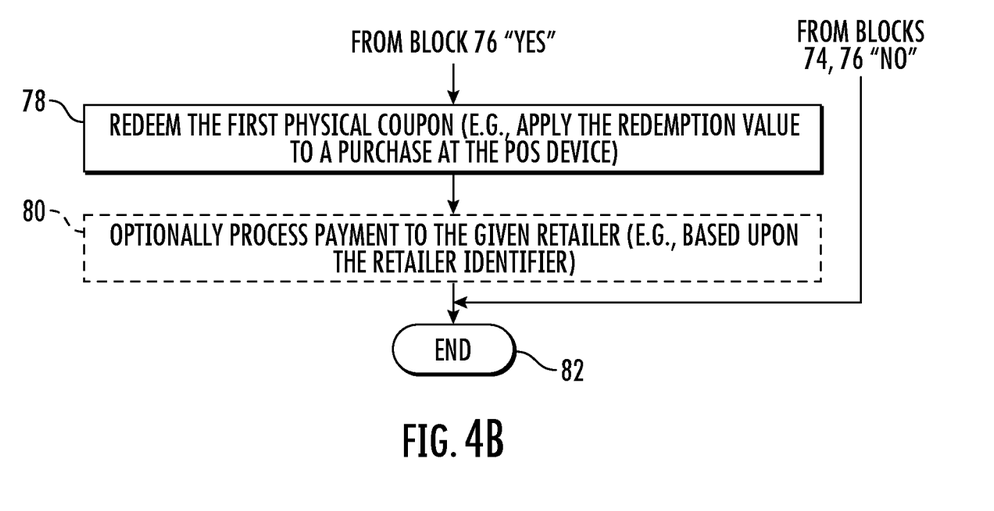

Referring now additionally to the flowchart 60 in FIGS. 4a and 4b, beginning at Block 62, operations of the coupon redemption server 40 will now be described. The coupon redemption server 40, at Block 64, obtains a first physical coupon image 22 from the mobile wireless communications device 30. The first physical coupon image 22 corresponds to a first physical coupon 21. The first physical coupon 21 may include, for example, on a face thereof, an image of the product 52 associated with the first physical coupon, a redeemable value 53, an expiration date 54, and/or a machine readable code 55 (e.g., a barcode) that can be used by a point-of-sale (POS) device 50 at the retailer to facilitate redemption.

The given retailer may capture the first physical coupon image 22 of the first physical coupon 21 by way of the camera 32 of the mobile wireless communications device 30. The mobile wireless communications device 30 may wirelessly communicate, via the wireless communications circuitry 33, the first physical coupon image 22 to the coupon redemption server 40. In some embodiments, the coupon redemption server 40 may cooperate with the mobile wireless communications device 30 to retrieve the first physical coupon image 22. The coupon redemption server 40 may obtain a retailer identifier 27 from the mobile wireless communications device 30, for example, communicated with the first physical coupon image 22.

At Block 68, the coupon redemption server 40 generates a first validation code 23 based upon the first physical coupon image 22. More particularly, upon receipt of the first physical coupon image 22, the coupon redemption server 40 may generate, for example, randomly, the first validation code 23 in the form of a numeric code and/or alphanumeric code. An exemplary first validation code 23 may be a 6-digit numerical code, such as 426952. The first validation code 23 may be generated sequentially, for example, or be generated according to pattern, such as, for example, characters or digits of the first validation code representing the given retailer or the retailer identifier 27 associated with the given retailer (e.g., and communicated with the first physical coupon image 22).

The coupon redemption server 40 may store a database of first validation codes 44, for example, in the memory 42, that correspond to previously generated first validation codes. The coupon redemption server 40 may, prior to generating the first validation code 23, perform a lookup in the database 44 so that the generated first validation code 23 is not repeated or has been previously used. A given first validation code 23 may be removed from the database 44 after a threshold amount of time from being stored in the database (i.e., from generation), for example, after 4-6 months, whereby the chances of reuse or fraudulent use are reduced. In some embodiments, the database 44 may correspond to available first validation codes 23 rather than previously used first validation codes.

The coupon redemption server 40 communicates the first validation code 23 to the mobile wireless communications device 30 for display on the display 35 (Block 70). More particularly, the coupon redemption server 40 may cooperate with the mobile wireless communications device 30 to prompt the given retailer to add the first validation code 23 to the first physical coupon 21. The given retailer may be prompted to write, for example, using an ink pen, pencil, marker, or other device to visually distinguish the first validation code 23 from the remainder of the first physical coupon. The given retailer may be prompted to place the first validation code 23 on the face of the first physical coupon 21, for example, adjacent the machine readable code used for redeeming the first physical coupon.

The coupon redemption server 40, at Block 72, obtains a second physical coupon image 25 from the mobile wireless communications device 30 for a corresponding second physical coupon 24. The second physical coupon image 25 may be obtained similarly to the first physical coupon image 22, for example, via the camera 32 of the mobile wireless communications device 30. The retailer identifier 27 may also be obtained along with the second physical coupon image 25. The second physical coupon 24 has a second validation code 26 thereon. More particularly, the second physical coupon 24 has the second validation code 26 written thereon, for example, as prompted with respect to the first validation code 23 (i.e., written thereon the face of the second physical coupon).

In an exemplary valid redemption process of the given retailer, the given retailer writes the first validation code 23 on the first physical coupon 21 so that the first physical coupon image 22 including the first validation code 23 matches the second physical coupon image 25 defined or represented by the second physical coupon 24 with the second validation code 26. In other words, the first physical coupon 21 with the first validation code 23 thereon is the same as the second physical coupon 24 with the second validation code 26 during a proper redemption, and thus, the first and second physical coupon images 22, 25 should match (since the second physical coupon is the same coupon as the first physical coupon). In an exemplary invalid or fraudulent redemption process, the first and second physical coupon images 22, 25 will not match, and/or the first and second validation codes 23, 26 will also not match, such as, for example, if a physical coupon is improperly reused (e.g., if the first validation code is written on another physical coupon, or another validation code is written on the first coupon).

Accordingly, the redemption server, at Block 74, determines whether the first and second physical coupon images 22, 25 indicate a match between the corresponding first and second physical coupons 21, 24. The coupon redemption server 40 may determine whether the first and second physical coupon images 22, 25 indicate a match between the corresponding first and second physical coupons 21, 24 based upon image recognition techniques. For example, the coupon redemption server 40 may determine whether the first and second physical coupon images 22, 25 indicate a match between the corresponding first and second physical coupons 21, 24 based upon performing an optical character recognition (OCR) of the first and second physical coupon images (not including the second validation code 26). The OCR text, for example, images, and/or machine readable code may be mapped, for example, to a relative coordinate system (e.g., based upon an edge detection algorithm) such that each element (e.g., text, image, machine readable code) can be compared for a match, and also compared to determine a match of relative position. The coupon redemption server 40 may also determine whether the first and second physical coupon images 22, 25 indicate a match between the corresponding first and second physical coupons 21, 24 based upon colors. For example, the coupon redemption server 40 may convert sampled colors at a given coordinate in the first coupon image 22 to an equivalent hexadecimal representation for comparison to the hexadecimal representation of the color at the same coordinate in the second coupon image 25.

The coupon redemption server 40 may alternatively or additionally perform a pixel-by-pixel comparison. The coupon redemption server 40 may determine whether the first and second physical coupon images 22, 25 indicate a match between the corresponding first and second physical coupons 21, 24 when a threshold amount of characteristics match, which may be indicative, to a certain degree of certainty that the first and second physical coupon images match. For example, the first and second physical coupon images 22, 25 may have been captured at different angles relative to the mobile wireless communications device 30, which may provide one or more mismatches in characteristics. Similarly, different focusing may provide similar mismatched characteristics. However, by matching to a threshold amount of characteristics, a match may accurately be determined, even with varying conditions during acquisition.

If, at Block 74, the coupon redemption server 40 determines that the first and second physical coupon images 22, 25 indicate a match between the corresponding first and second physical coupons 21, 24, the coupon redemption server determines whether the first and second validation codes 23, 26 match (Block 76). If, at Block 74, the coupon redemption server 40 determines that the first and second physical coupon images 22, 25 indicate a mismatch between the corresponding first and second physical coupons 21, 24, operations end at Block 82. Those skilled in the art will appreciate that, while it has been described that the coupon redemption server 40 determines a match between the first and second physical coupon images 22, 25 before determining a match between the first and second validation codes 23, 26, the coupon redemption server may determine whether the first and second validation codes match prior to or concurrently to determining whether the first and second physical coupon images match.

The coupon redemption server 40 may determine the match between the first and second redemption codes 23, 26 similarly to determining a match between the first and second coupon images 22, 25. For example, the coupon redemption server 40 may determine whether the first and second validation codes 23, 26 match based upon performing an OCR of the second validation code (as written on the second physical coupon 24) and comparing it to the generated first validation code. The coupon redemption server 40 may alternatively or additionally use any of the matching techniques described above with respect to the matching of the first and second physical coupon images 22, 25.

The coupon redemption server 40 may associate the first and second physical coupon images 22, 25 with the given retailer based upon the associated retailer identifier 27, for example, communicated along with the first and second physical coupon image. The coupon redemption server 40 may thus associate the first and second physical coupon images 22, 25, for example, for quicker matching, particularly, for example, in the case where the coupon redemption server is accepting multiple physical coupon images and matching request from multiple retailers.

If at Block 76, the coupon redemption server 40 determines a match between the first and second validation codes 23, 26, the coupon redemption server redeems the first physical coupon 21 (Block 78). More particularly, the coupon redemption server 40 may cooperate with the POS device 50 to redeem the first physical coupon 21 at the given retailer by applying the redemption value associated with the first physical coupon to a purchase at the POS device. Upon redemption, the first validation code 23 that may be associated with the retailer identifier 27 may be marked as used or redeemed, for example, in the database of first validation codes 44. If at Block 76, the coupon redemption server 40 determines a mismatch between the first and second validation codes 23, 26, operations end at Block 82.

At Block 80, the coupon redemption server 40 may optionally process payment to the given retailer upon redemption of the first physical coupon 21. More particularly, the coupon redemption server 40 may process the payment to the given retailer based upon the retailer identifier 27. The coupon redemption server 40 may cooperate with a payment processing server or a financial institution to facilitate payment from a manufacturer, for example, associated with the first physical coupon 21. The coupon redemption server 40 may provide an accounting of the redeemed coupons associated with the given retailer, and, for example, cause or facilitate payment to the given retailer based upon the retailer identifier 27 and based upon the accounting. In other words, the coupon redemption server 40 may serve as an intermediary (e.g., payment intermediary) between the given retailer and a manufacturer. Operations end at Block 82.

Figure 5:
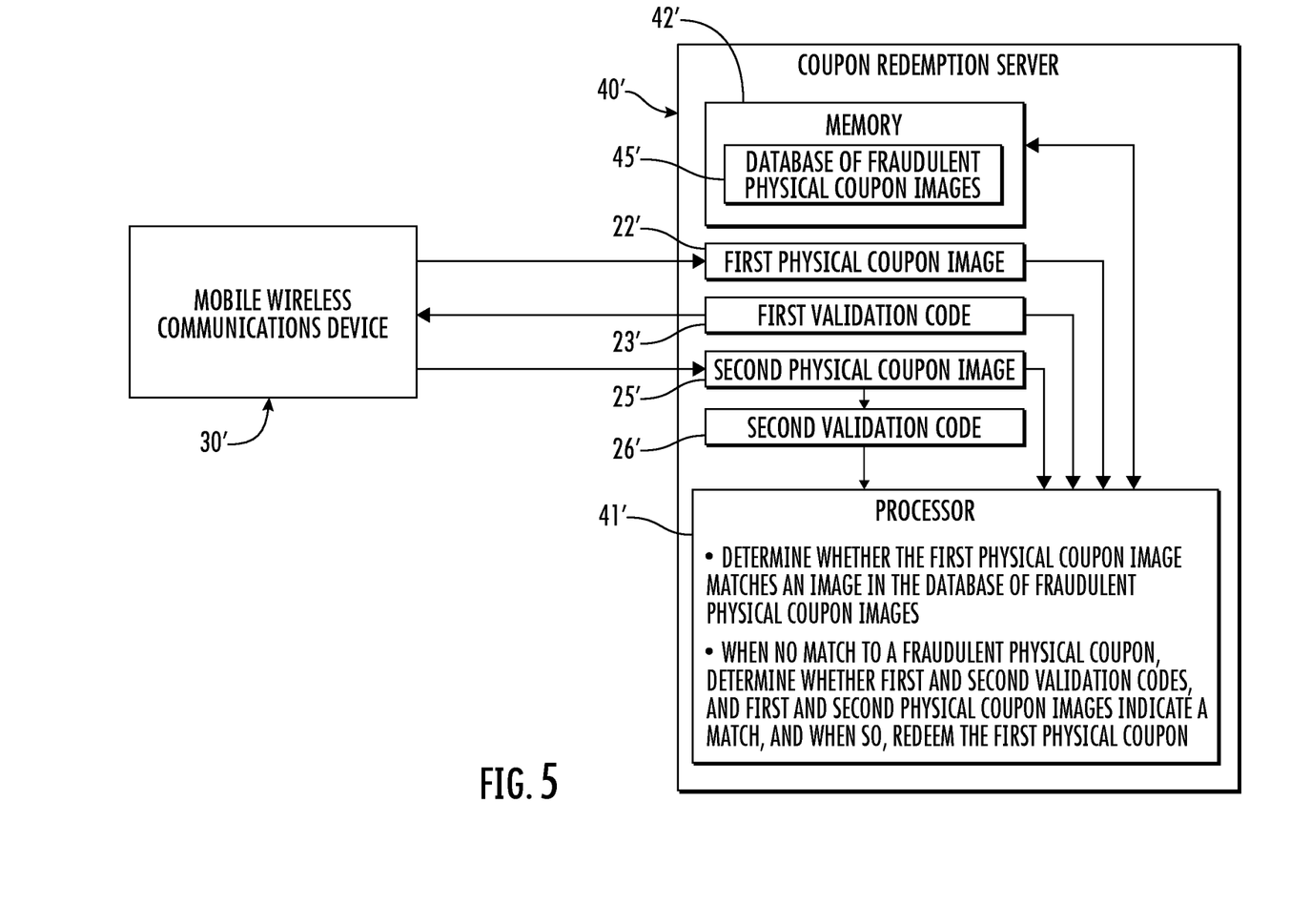
FIG. 5 is a schematic block diagram of a physical coupon redemption system in accordance with another embodiment.
Figure 6A:
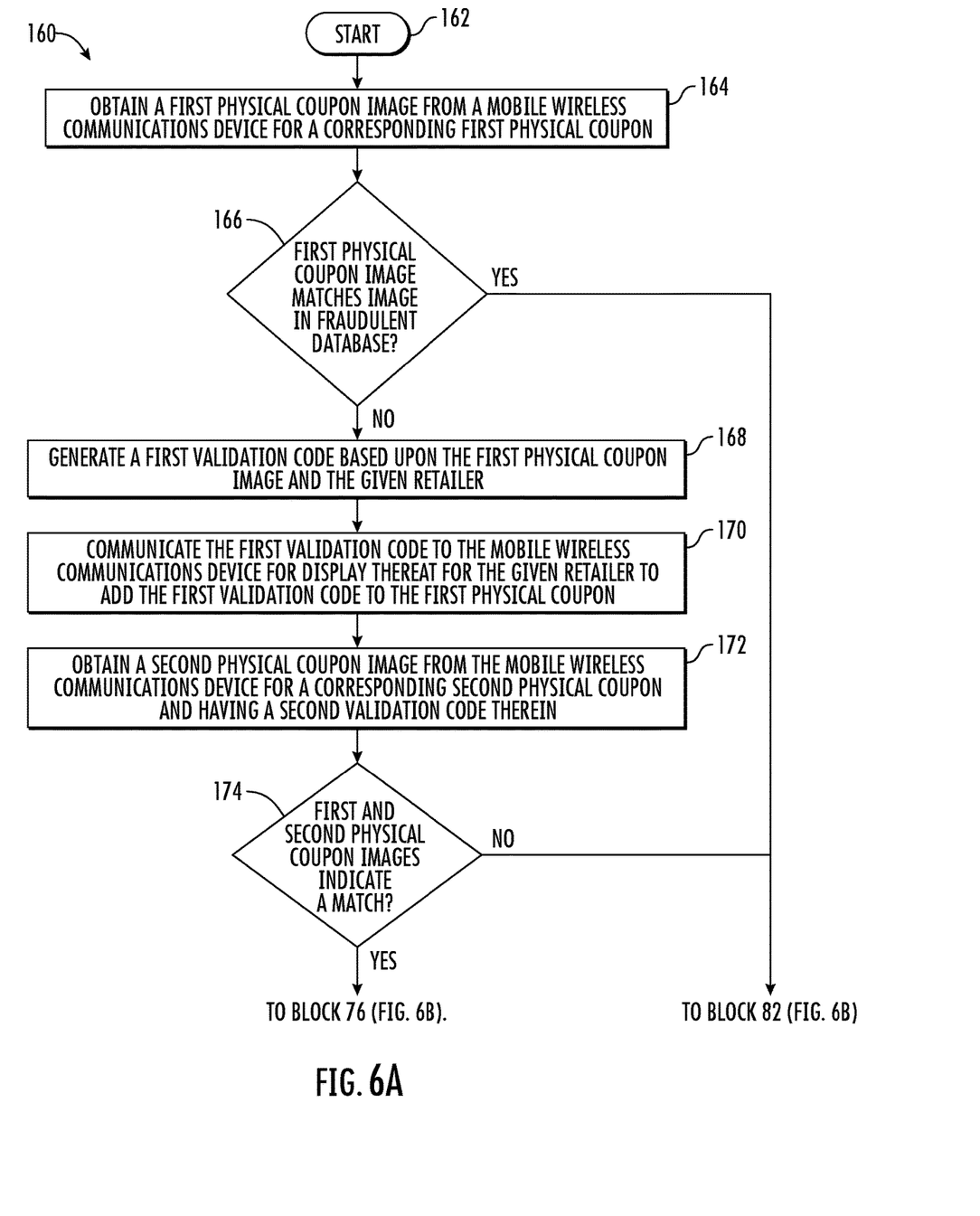
FIGS. 6a and 6b are flow diagrams illustrating operation of the coupon redemption server of the physical coupon redemption system of FIG. 5.
Figure 6B:
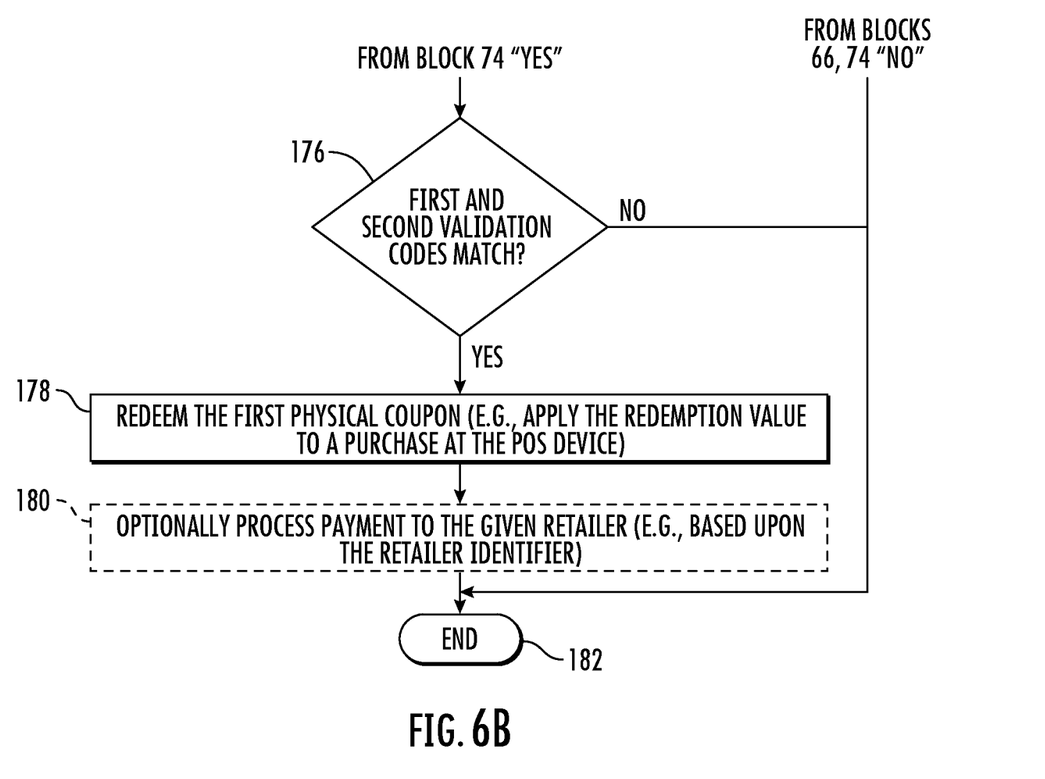

Referring now to FIG. 5 and the flowchart 160 in FIGS. 6a and 6b, beginning at Block 162, in another embodiment, the coupon redemption server 40' may perform fraud detection. The operation of obtaining the first physical coupon image 22' (Block 164) is similar to the corresponding operation described with respect to the embodiment above.

The coupon redemption server 40' stores, for example, the memory 42' a database of fraudulent physical coupon images 45'. For example, images of known fraudulent physical coupons may be obtained, for example, scanned or photographed, and uploaded to the database of fraudulent physical images 45'. At Block 166, the coupon redemption server 40', by way of the processor 41', may determine whether the first physical coupon image 22' is or matches to an image in the database of fraudulent physical coupon images 45'. The coupon processing server 40' may determine a match using the techniques described above, for example. If, at Block 166, the first physical coupon image 22' does not match an image in the database of fraudulent physical coupon images 45', operations continue to Block 168 where the first validation code 23' is generated. Operations continue similarly to those described above, particularly, the coupon processing server 40' communicates the first validation code 23' (Block 170) to the mobile wireless communications device 30', obtains the second physical coupon image 25' (Block 172), determines whether the first and second physical coupon images 22', 25' indicate a match between the corresponding first and second physical coupons (Block 174), determines whether the first and second validation codes 23', 26' match (Block 176), and when so, redeems the first physical coupon (Block 178) before ending at Block 182.

As will be appreciated by those skilled in the art, a given retailer typically submits or sends (e.g., via a package in the mail) paper coupons in their original form to a paper coupon clearinghouse whereby the physical coupons are counted and validated. Based upon the manual counting and validation, the given retailer would receive payment. However, while a larger retailer that, for example, processes hundreds or even thousands of physical coupons in a relatively short time, a smaller retailer may only process a few physical coupons in the same time period. Based upon the relatively small volume of paper coupons being processed, it may be undesirable for a smaller retailer to process these physical coupons in terms of both cost and efficiency, for example. Thus a smaller retailer may choose to not accept physical or paper coupons. However, the smaller retailer may lose business by not accepting physical coupons, so it may thus be desirable to the smaller retailer to accept the physical coupons.

The present physical coupon redemption system 20 may thus permit a smaller retailer to accept and electronically process physical coupons while not having to send or mail the physical coupons to a clearinghouse for processing. Moreover, this functionality may be employed with a mobile phone 30 operating as an "add-on" device, for example, to operate with an existing POS device or system (i.e., no additional programming may be required with respect to the POS device, for example). While the mobile wireless communications device 30 may be considered an "add-on" device, for example, may perform as the POS device. In other words, the mobile wireless communications device 30 also functions as the POS device and there may be no separate POS device. The physical coupon redemption system 20 may also advantageously provide, for example, via use of the first validation codes 23, reduced fraudulent activity, which may exist in the processing and redemption of physical coupons, as will be appreciated by those skilled in the art.

A method aspect is directed to a method of redeeming a physical coupon. The method includes using a coupon redemption server 40 to obtain a first physical coupon image 22 from a mobile wireless communications device 30 associated with a given retailer, the first physical coupon image being for a corresponding first physical coupon 21. The method also includes using the coupon redemption server 40 to generate a first validation code 23 based upon the first physical coupon image 22 and the given retailer, and communicate the first validation code to the mobile wireless communications device 30 for display thereat for the given retailer to add the first validation code to the first physical coupon 21. The method further includes using the coupon redemption server 40 to obtain a second physical coupon image 25 from the mobile wireless communications device 30 for a corresponding second physical coupon 24 and having a second validation code 26 therein, and determine whether the first and second validation codes 23, 26 match and determine whether the first and second physical coupon images 22, 25 indicate a match between the corresponding first and second physical coupons 21, 24, and when so redeem the first physical coupon.

A computer readable medium aspect is directed to a non-transitory computer readable medium for redeeming a physical coupon. The non-transitory computer readable medium includes computer executable instructions that when executed by a processor 41 cause the processor to perform operations. The operations may include obtaining a first physical coupon image 22 from a mobile wireless communications device 30 associated with a given retailer, the first physical coupon image being for a corresponding first physical coupon 21, and generating a first validation code 23 based upon the first physical coupon image and the given retailer. The operations may also include communicating the first validation code 23 to the mobile wireless communications device 30 for display thereat for the given retailer to add the first validation code to the first physical coupon 21, and obtaining a second physical coupon image 25 from the mobile wireless communications device for a corresponding second physical coupon and having a second validation code 26 therein. The operations may also include determining whether the first and second validation codes 23, 26 match and determining whether the first and second physical coupon images 22, 25 indicate a match between the corresponding first and second physical coupons 21, 24, and when so redeeming the first physical coupon.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A physical coupon redemption system comprising:
    a mobile wireless communications device associated with a given retailer; and
    a coupon redemption server configured to
        obtain a first physical coupon image from the mobile wireless communications device for a corresponding first physical coupon,
        generate a first validation code based upon the first physical coupon image and the given retailer,
        communicate the first validation code to the mobile wireless communications device for display thereat for the given retailer to add the first validation code to the first physical coupon,
        obtain a second physical coupon image from the mobile wireless communications device for a corresponding second physical coupon and having a second validation code therein,
        determine whether the first and second validation codes match,
        determine whether the first and second physical coupon images indicate a match between the corresponding first and second physical coupons by at least
            performing an optical character recognition (OCR) of text, without the second validation code, from the first and second physical coupon images,
            extracting at least one of an image and machine readable code from the first and second physical coupon images,
            mapping the OCR text and at least one of the image and machine readable code from the first and second physical coupon images to a relative coordinate system,
            matching the OCR text and at least one of the image and machine readable code from the first and second physical coupon images based upon a comparison,
            matching a relative position of the OCR text and at least one of the image and machine readable code from the first and second physical coupon images based upon the relative coordinate system, and
            matching a threshold amount of pixels between the first and second physical coupon images based upon a pixel-by-pixel comparison, and
        when the first and second validation codes match and the first and second physical coupons indicate a match, redeem the first physical coupon.

2. The physical coupon redemption system of claim 1 wherein the coupon redemption server is configured to determine whether first and second validation codes match based upon performing an optical character recognition (OCR) of the second physical coupon image.

3. The physical coupon redemption system of claim 1 wherein the coupon redemption server is configured to store a database of fraudulent physical coupon images, and generate the first validation code based upon determining whether the first physical coupon image does not match a stored fraudulent physical coupon image.

4. The physical coupon redemption system of claim 1 further comprising a point-of-sale (POS) device associated with the given retailer; wherein the first physical coupon has a redemption value associated therewith; and wherein the coupon redemption server is configured to cooperate with the POS device to redeem the first physical coupon by applying the redemption value to a purchase at the POS device.

5. The physical coupon redemption system of claim 1 wherein the coupon redemption server is configured to process payment to the given retailer based upon redemption of the first physical coupon.

6. The physical coupon redemption system of claim 5 wherein the given retailer has a retailer identifier associated therewith; wherein the mobile wireless communications device is configured to communicate the retailer identifier to the coupon redemption server; and wherein the coupon redemption server is configured to process the payment to the given retailer based upon the retailer identifier.

7. The physical coupon redemption system of claim 1 wherein the coupon redemption server is configured to cooperate with the mobile wireless communications device to prompt the given retailer to add the first validation code to the first physical coupon.

8. The physical coupon redemption system of claim 1 wherein the mobile wireless communication device comprises:
    a housing;
    wireless communications circuitry carried by the housing;
    a camera carried by the housing; and
    a controller configured to
        cooperate with the wireless communications circuitry to perform at least one wireless communications function, and
        cooperate with the camera to acquire the first and second physical coupon images.

9. The physical coupon redemption system of claim 1 wherein the mobile wireless communications device comprises:
    a housing;
    a camera carried by the housing; and
    a controller configured to perform at least one point-of-sale (POS) device function, and cooperate with the camera to acquire the first and second physical coupon images.

10. A physical coupon redemption server comprising:
    a processor and an associated memory configured to
        obtain a first physical coupon image from a mobile wireless communications device associated with a given retailer, the first physical coupon image being for a corresponding first physical coupon,
        generate a first validation code based upon the first physical coupon image and the given retailer,
        communicate the first validation code to the mobile wireless communications device for display thereat for the given retailer to add the first validation code to the first physical coupon, obtain a second physical coupon image from the mobile wireless communications device for a corresponding second physical coupon and having a second validation code therein, and determine whether the first and second validation codes match, determine whether the first and second physical coupon images indicate a match between the corresponding first and second physical coupons by at least performing an optical character recognition (OCR) of text, without the second validation code, from the first and second physical coupon images, extracting at least one of an image and machine readable code from the first and second physical coupon images, mapping the OCR text and at least one of the image and machine readable code from the first and second physical coupon images to a relative coordinate system, matching the OCR text and at least one of the image and machine readable code from the first and second physical coupon images based upon a comparison, matching a relative position of the OCR text and at least one of the image and machine readable code from the first and second physical coupon images based upon the relative coordinate system, and matching a threshold amount of pixels between the first and second physical coupon images based upon a pixel-by-pixel comparison, and when the first and second validation codes match and the first and second physical coupons indicate a match, redeem the first physical coupon.

11. The physical coupon redemption server of claim 10 wherein the processor is configured to determine whether first and second validation codes match based upon performing an optical character recognition (OCR) of the second physical coupon image.

12. A method of redeeming a physical coupon comprising:

using a coupon redemption server to obtain a first physical coupon image from a mobile wireless communications device associated with a given retailer, the first physical coupon image being for a corresponding first physical coupon, generate a first validation code based upon the first physical coupon image and the given retailer, communicate the first validation code to the mobile wireless communications device for display thereat for the given retailer to add the first validation code to the first physical coupon, obtain a second physical coupon image from the mobile wireless communications device for a corresponding second physical coupon and having a second validation code therein, and determine whether the first and second validation codes match, determine whether the first and second physical coupon images indicate a match between the corresponding first and second physical coupons by at least performing an optical character recognition (OCR) of text, without the second validation code, from the first and second physical coupon images, extracting at least one of an image and machine readable code from the first and second physical coupon images, mapping the OCR text and at least one of the image and machine readable code from the first and second physical coupon images to a relative coordinate system, matching the OCR text and at least one of the image and machine readable code from the first and second physical coupon images based upon a comparison, matching a relative position of the OCR text and at least one of the image and machine readable code from the first and second physical coupon images based upon the relative coordinate system, and matching a threshold amount of pixels between the first and second physical coupon images based upon a pixel-by-pixel comparison, and when the first and second validation codes match and the first and second physical coupons indicate a match, redeem the first physical coupon.

13. The method of claim 12 wherein using the coupon redemption server comprises using the coupon redemption server to determine whether first and second validation codes match based upon performing an optical character recognition (OCR) of the second physical coupon image.

14. A non-transitory computer readable medium for redeeming a physical coupon, the non-transitory computer readable medium comprising computer executable instructions that when executed by a processor cause the processor to perform operations comprising:

obtaining a first physical coupon image from a mobile wireless communications device associated with a given retailer, the first physical coupon image being for a corresponding first physical coupon;

generating a first validation code based upon the first physical coupon image and the given retailer;

communicating the first validation code to the mobile wireless communications device for display thereat for the given retailer to add the first validation code to the first physical coupon;

obtaining a second physical coupon image from the mobile wireless communications device for a corresponding second physical coupon and having a second validation code therein; and determining whether the first and second validation codes match;

determining whether the first and second physical coupon images indicate a match between the corresponding first and second physical coupons by at least performing an optical character recognition (OCR) of text, without the second validation code, from the first and second physical coupon images, extracting at least one of an image and machine readable code from the first and second physical coupon images, mapping the OCR text and at least one of the image and machine readable code from the first and second physical coupon images to a relative coordinate system, matching the OCR text and at least one of the image and machine readable code from the first and second physical coupon images based upon a comparison, matching a relative position of the OCR text and at least one of the image and machine readable code from the first and second physical coupon images based upon the relative coordinate system, and matching a threshold amount of pixels between the first and second physical coupon images based upon a pixel-by-pixel comparison; and when the first and second validation codes match and the first and second physical coupons indicate a match, redeeming the first physical coupon.

15. The non-transitory computer readable medium of claim 14 wherein the operations comprise determining whether first and second validation codes match based upon performing an optical character recognition (OCR) of the second physical coupon image.

\* \* \* \* \*